United States Patent [19]

Landsman

[11] 3,779,779

[45] Dec. 18, 1973

[54] RADIATION ETCHABLE PLATE

[75] Inventor: Robert M. Landsman, Norwalk, Conn.

[73] Assignee: The Perkin-Elmer Corporation, Norwalk, Conn.

[22] Filed: May 20, 1971

[21] Appl. No.: 145,315

[52] U.S. Cl. .................... 96/36.3, 96/35, 96/38.1, 96/38.2, 101/401.1, 178/6.6 B, 178/6.7 R

[51] Int. Cl. .................... G03c 5/00

[58] Field of Search .................... 96/35, 49, 36.3, 96/38.1, 38.2; 117/36.7, 36.8, 36.9; 101/401.1; 178/6.6 B, 6.7 R

[56] References Cited

UNITED STATES PATENTS

| | | | |
|---|---|---|---|
| 3,272,629 | 9/1966 | Hills | 96/49 |
| 3,181,170 | 7/1963 | Akin | 178/6.6 B |
| 3,057,999 | 3/1960 | Newman et al. | 117/36.7 |
| 3,093,478 | 12/1961 | Peterson et al. | 96/35 |

FOREIGN PATENTS OR APPLICATIONS

| | | | |
|---|---|---|---|
| 761,075 | 11/1956 | Great Britain | 101/401.1 |

*Primary Examiner*—Norman G. Torchin
*Assistant Examiner*—Richard L. Schilling
*Attorney*—Edward R. Hyde, Jr.

[57] ABSTRACT

A plate blank adapted to be selectively etched by radiant energy to form a desired relief pattern thereon for forming a relief printing plate or for decorative or artistic purposes consists of a sheet of thermoplastic material having voids therein that collapses within its own volume when heated to its softening temperature by applying a particular type of radiant energy, such as infrared radiation. A template of the desired pattern, made of material which reflects the type of radiant energy to be applied for collapsing the sheet material, is placed or formed on the surface of the sheet. The radiant energy thereafter heats and collapses the exposed areas of the sheet but is reflected from the areas that are shielded by the reflective template patterns which are therefore left in relief.

9 Claims, 8 Drawing Figures

INVENTOR
Robert M. Landsman

BY John K. Conant

ATTORNEY.

INVENTOR.
Robert M. Landsman
BY John K. Conant
ATTORNEY.

RADIATION ETCHABLE PLATE

The present invention relates to the formation of relief patterns on plates by etching, to plates adapted to have patterns of relief formed thereon. In particular, the invention is a plate blank adapted to be etched by radiant energy, and a method of thus etching the plate. Plates may have relief patterns formed thereon in accordance with this invention for any desired purpose, such as to form decorative or artistic cameo or intaglio designs, but the invention is particularly adapted and intended for providing a printing plate for use with conventional letterpress and letterset printing apparatus.

At present plates for letterpress and letterset printing are customarily prepared by casting them of type metal, the molds for the finishing plates being formed by typesetting machines, such as Linotype machines.

Considerable effort has been expended by try to simplify and automate as much as possible the process of making letterpress and letterset printing plates on which the particular format of lettering and illustrations to be printed are reproduced in relief. To this end systems have been devised for transforming a desired format automatically into computer language by optical scanning techniques and utilizing a computer to operate typesetting and molding apparatus to form type metal printing plates in the conventional manner. These mold forming and casting techniques are rather expensive and cumbersome, however, the attempts have been made to devise simpler, faster and less expensive plates and plate forming techniques. To this end, systems have been devised for etching blank plates of suitable materials, such as synthetic resin plastics with laser beams or electron beams. However, apparatus utilizing electron beams is generally so expensive and difficult to operate for this purpose as to be economically impractical and lasers currently available do not have sufficient power to etch deep enough within a reasonable amount of time to produce a relief pattern suitable for commercial letterpress and letterset printing. Materials which would be capable of being etched to a suitable depth in an acceptable time interval would be too soft to resist wear or deformation under pressure long enough for more than a limited number of satisfactory impressions to be made. To be commercially practical a printing plate should be able to print in excess of about 50,000 sharp copies.

A principal object of the present invention is to provide a printing plate blank which is relatively inexpensive, on which a relief pattern of the desired format can be reproduced by simple and economic means, which is adapted for use with letterpress and letterset printing presses that are currently in service for commercial printing — for printing newspapers, books and the like — and which forms a printing plate that will produce a sufficient number of sharp copies, in excess of 50,000 copies for example, as required in commercial printing operations.

In brief, the printing plate blank of the present invention consists essentially of a sheet of thermoplastic material, such as a synthetic resin plastic, having voids therein, which will collapse within its own volume when heated to its softening temperature by application of radiant energy, such as infrared radiation. Areas of the sheet which are to be in relief in the finished plate are covered by a template pattern of a material, such as aluminum, bismuth, cadmium, gold, silver or zinc, which reflects the type of radiation to be applied for softening and collapsing portions of the thermoplastic sheet. Thus, when the appropriate type of radiant energy is applied to the surface of the plate, the areas of the sheet which are exposed soften and collapse to leave in relief the areas that are shielded by the reflective template pattern.

The reflective template pattern may be formed on the thermoplastic sheet in a variety of ways. For example, a reflective template pattern, or elements thereof, such as individual letters or designs, may be precut from thin sheets of suitable reflective material, such as aluminum, and cemented on the surface of the thermoplastic sheet; reflective material in the form of a paste or a liquid may be painted or printed on the sheet; or the sheet may be covered with a thin film of the reflective material in which case selected areas of the reflective film are removed so that areas that are left define the desired template pattern. The thin film of reflective material may have selected areas removed by scraping as with a stylus, by acid etching, or by heating selected areas sufficiently to evaporate the film in those areas.

The film may be acid etched using a known photoresist technique. The film is coated with a conventional photoresist material onto which a desired pattern is optically projected. When the photoresist material is developed, fixed and washed, the exposed areas remain as acid resistant deposits while the unexposed areas wash off uncovering underlying areas of the reflective film which are then removed by acid.

In accordance with one form of printing plate blank embodying the invention, the thermoplastic sheet is covered by a thin film of reflective material and the reflective film is in turn covered by a film of material which will absorb sufficient heat from a beam of radiant energy, such as a laser beam, to evaporate, and thus remove, the immediately underlying areas of the reflective film. The beam of radiant energy is thus applied to the absorbent film to vaporize and remove selected areas of the reflective film so that the remaining areas of reflective film define the desired reflective template pattern. The heated areas of the absorbent film normally come off with the vaporized portions of the reflective film; the portions of absorbent film still on the remaining areas of reflective film are then preferably wiped off. The plate is then in condition for the relief pattern to be formed by applying the radiant energy which collapses the unshielded areas of the thermoplastic sheet. A method and apparatus for forming a desired relief pattern on this type of printing plate blank is described in a copending U. S. patent application. Ser. No. 145,187 filed May 20, 1971 for "Printing Plate Production Method and Apparatus". As described therein, a paste-up or other graphic representation of material to be reproduced in relief on the plate is scanned to produce signals representing the light and dark areas of the material scanned. These signals are applied to modulate a laser beam that scans the plate in synchronism with the scanning of the graphic representation for selectively heating areas of the absorbent film to vaporize the underlying areas of the reflective film in conformance with the pattern of material to be reproduced.

Further objects, advantages and features of radiation etchable letterpress printing plate blanks in accordance with this invention will be apparent from the following detailed description of an illustrative embodiment of such a plate blank and of an illustrative method of producing a desired relief pattern thereon, described with reference to the accompanying drawings in which.

Figures 1, 2:
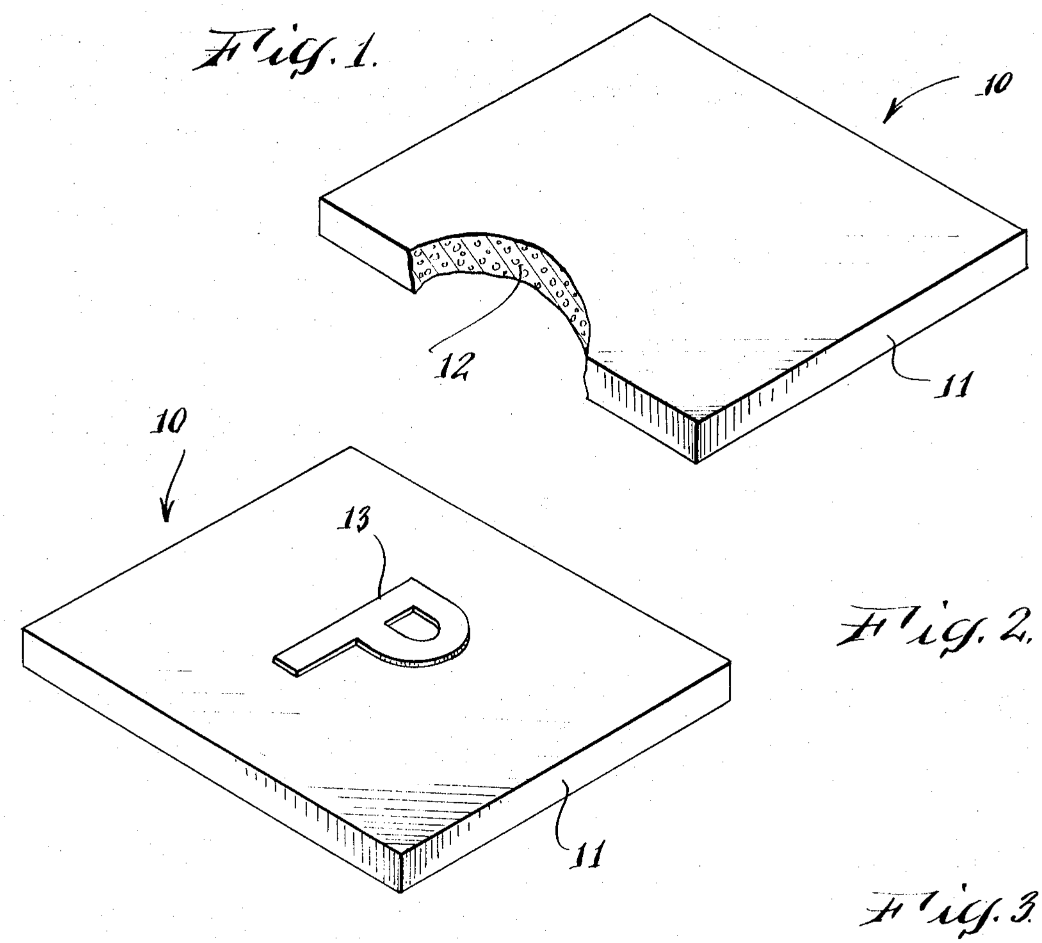
FIG. 1 is an isometric view, partly broken away, of a printing plate blank of the present invention.
FIG. 2 is a view similar to the view of FIG. 1 showing the plate of FIG. 1 prepared for the production of a desired relief pattern thereon by the application of radiant energy.

Referring to FIG. 1 of the drawings, a printing plate blank 10 in accordance with this invention consists essentially of a sheet 11 of a thermoplastic material which collapses within itself when heated to its softening temperature by application of a particular type of radiant energy, such as infrared radiation.

The sheet 11 is suitably a thermoplastic synthetic resin plastic, such as polyethylene, urethane, polypropylene or nylon for example, which has a multiplicity of small closely spaced voids 12 dispersed uniformly throughout it. The voids 12 may be either open cell pores or bubbles. The smaller the voids, and the more closely they are spaced, the sharper will be the definition of the relief pattern formed. In practice, voids 12 of substantially uniform size —about 0.0003 of an inch or smaller, and preferably about 0.0001 of an inch, in diameter— uniformly and closely spaced throughout the material so that about 50 percent of the volume of the sheet 11 is voids, provides a relief pattern which will more than satisfy current standards of definition and durability for quality book printing. However, acceptable printing is accomplished with a plate formed from a sheet 11 having substantially uniformly sized, uniformly spaced voids whose average diameters are in the range of from about 0.00003 of an inch, minimum, to about 0.003 of an inch, maximum —the best results being achieved with voids in the range from about 0.0001 to about 0.001 of an inch in diameter—, the voids comprising from about 15 percent to about 70 percent of the volume of the sheet 11.

A sheet 11 having appropriately sized voids 12 may be formed in any convenient way; for example, it may be formed by sintering particles of suitable thermoplastic material into a coherent porous mass, or granules of soluble material may be worked into the thermoplastic material and then leached out. Granules of water soluble salt are suitable for this purpose.

A particularly suitable material for the sheet 11 is nylon incorporating a multiplicity of voids 12 spaced and sized as described above. A sheet 11 of nylon is heat softenable (i.e., its surface tension is reduced, sufficiently to collapse within its own volume by sinking into the voids) by applying infrared radiation, which has a black body temperature of about 600° C, to the surface of the sheet for from about two to about 15 seconds, depending on the temperature of the material when the radiation is applied. The quality of the relief and the irradiation time may be reduced to the lower limit by preheating the material to a temperature approaching its softening temperature in any suitable manner, such as by blowing warm air over it or by placing it in a heated chamber for a brief time. Also the collapse of the material, elimination of residual bubbles and the amount of the relief is enhanced by placing the sheet 11, or at least its underside, in a partial vacuum during the irradiation.

Referring to FIG. 2 a desired relief pattern is formed on a surface of the sheet 11 by placing on it A template 13 which corresponds to the pattern of relief desired. In the drawings the template 13 is illustrated as being the form of a letter P. The template 13 is made of a material that reflects the type of radiant energy to be applied for collapsing the sheet. Thus, when the radiant energy is applied to the surface of the sheet, the exposed areas of the sheet collapse and leave in relief the areas that are shielded by the template.

Infrared radiation is appropriate for softening and collapsing sheets 11 made of synthetic resin plastics, such as nylon, polyethylene, polypropylene and urethane, and is suitably reflected in accordance with the practice of this invention by a thin film — on the order of 1 micro inch thick — of aluminum, bismuth, cadmium, gold, silver or zinc, for example.

Figure 3:
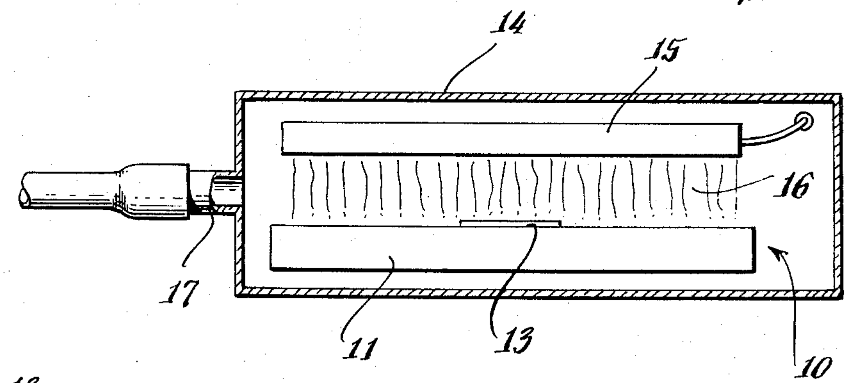
FIG. 3 is an end view of the plate of FIG. 2 illustrating a preferred manner of applying radiant energy for producing the desired relief pattern thereon.

FIG. 3 illustrates a suitable arrangement for applying infrared or other appropriate radiation for collapsing uncovered areas of the sheet 11. As shown, the partially processed plate 10 consisting of the sheet 11 with a reflecting template pattern 13 thereon is placed under a conventional infrared panel lamp element 15 in a vacuum chamber 14. The lamp element 15 is adapted and arranged to produce infrared radiation over an area, indicated at 16, coextensive with the area of the plate surface to be irradiated. A partial vacuum, the amount of which is not critical, is created in the chamber 14 by a conventional pump (not shown) connected to its outlet 17 and the infrared panel lamp element 15 is turned on long enough —from about two to about 15 seconds, as above— for the sheet 11 to be softened and collapse. The vacuum is then relieved and the plate removed from the chamber.

Figure 4:
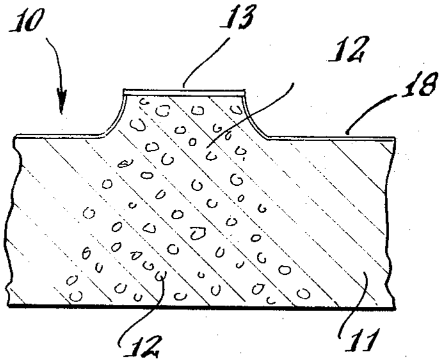
FIG. 4 is a partial cross-sectional view through a portion of the relief pattern produced on the plate by the application of radiant energy to it, as in the manner illustrated in FIG. 3.

FIG. 4 shows in cross section the appearance of the collapsed and of the relief portions of the plate 10 after irradiation. The collapsed portions are solid while the portions shielded by the reflective template pattern 13 still contain voids 12 and are substantially their original thickness. The softening of the sheet to collapse it by irradiation in the above manner results in a skin 18 over the collapsed areas which seals the surface even though there may be small pores left in the interior of the collapsed regions. Thus, if the voids 12 are open cell pores interconnected through the sheet 11, it would be possible to utilize a plate of this invention having a relief pattern formed thereon as above in a silk screen form of reproduction processing. For this purpose the reflective template pattern 13 would be removed from the relief portions so that ink squeezed onto the back of the plate (underside in FIG. 4) would pass through the open cell pore structure at the relief portions of the plate but could not pass through the substantially solid collapsed portions, for even if there were some minute passages through the collapsed portions, these would be closed off by the skin 18.

The template 13 may be formed and placed on the sheet 11 in a number of different ways. For example, particular designs or individual letters may be cut from a sheet of suitable reflective material and placed on the sheet in a desired arrangement, or a template design may be painted or printed thereon using a paste or solution of the reflective material. Alternatively, as illustrated by the form of plate blank 10' illustrated in FIG. 5, the surface of the sheet 11 on which the relief pattern is to be formed is coated or otherwise covered with a film 19 of suitably reflective material. The reflective template for the relief pattern is then formed by removing selected areas of the film to uncover underlying areas of the sheet 11 so that the areas of film 19 remaining in place define the desired template configuration. Selected areas of the film 19 may be removed in a variety of ways; for example, they may be scraped off with a stylus, they may be evaporated in a manner which is subsequently described in detail, or they may be removed by acid etching. One suitable etching process is a photoresist process in which the film 19 is coated with a conventional photoresist material, such as polyvinyl alcohol which is photochemically changed into an acid resistant coating by exposure to ultraviolet light. A desired template pattern is optically projected onto the coating of photoresist material using ultraviolet light which "sets" the exposed areas. The coating is then developed and washed with an appropriate substance, such as xylene which leaves the exposed areas of the coating in place and washes off the unexposed areas to uncover the underlying reflective film 19 to allow only these areas to be etched away with an etching solution. A ferric chloride solution is suitable for etching away a reflective film of aluminum.

Figures 5, 6:
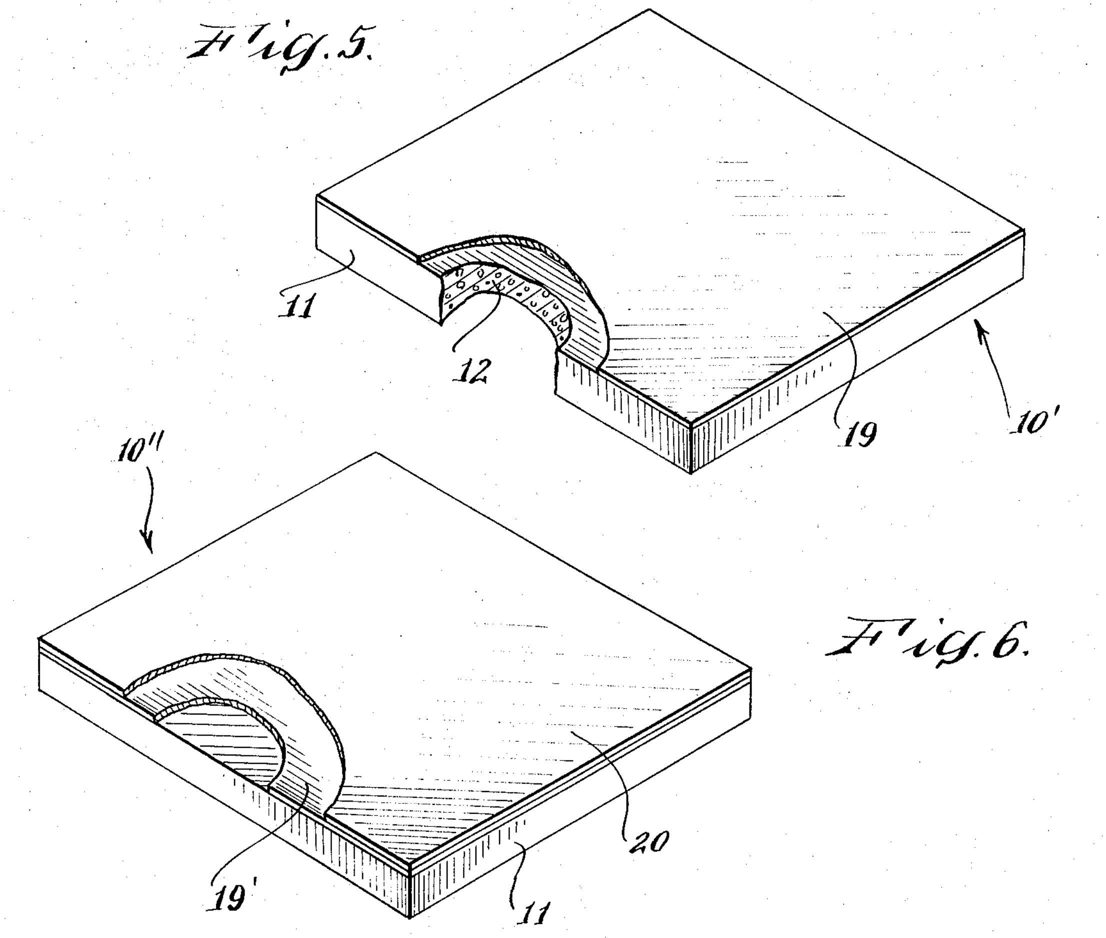
FIG. 5 is an isometric view, partly broken away, of another form of printing plate blank of the present invention.
FIG. 6 is an isometric view, partly broken away, of still another form of printing plate blank of the present invention.

FIG. 6 illustrates another form of plate blank, designated 10'' embodying the invention. In this form the collapsible sheet 11 is covered with a reflective film 19' which is adapted for selective areas to be removed by being heated to a temperature at which it evaporates. This is accomplished by covering the reflective film 19' with another layer or film 20 of non-reflective material, such as carbon or graphite, which will absorb sufficient heat from a particular type of radiant energy, such as coherent light from a laser, to evaporate underlying areas of the reflective film 19'.

The criteria for the reflective film 19' are, (1) that it must reflect the radiant energy applied to soften exposed portions of the sheet 11 so that the portions of the sheet 11 which are immediately below and thus shielded by the reflective film will not be softened to the collapsing point and (2) that it must be sufficiently thin or of such composition that selected, well defined areas of it are vaporized and pass off before the heat applied for vaporizing it heats the underlying material of sheet 11 to the softening point. A suitable reflective film 19' is a thin film of aluminum, on the order of about one micro-inch thick which may be applied to the sheet 11 by vacuum deposition in accordance with well known techniques.

The criteria for absorbent film 20 are, (1) that it absorb sufficient heat from a narrow beam of a particular type of radiant energy to vaporize the area of the reflective film 19' immediately underlying the portion of the absorbent film 20 to which the latter beam of radiant energy is directed and (2) that it is easily removable from the portions of the reflective film 19' which are not vaporized and which form the reflective template 13 (FIG. 2). The areas of the absorbent film 20 that are heated to vaporize underlying areas of the reflective film 19' are carried off with the vaporized material of film 12' so that the surface of the sheet 11 is exposed at these areas.

The absorbent layer or film 20 is suitably a film of carbon black on the order of one micro-inch thick. Heat for evaporating underlying portions of the reflective film 19' is suitably applied by a laser beam having a wavelength of about one micron. A YAG (yettrium aluminum garnet) laser is particularly suited for this purpose. The carbon black of absorbent film 20 remaining on the portions of the reflective film 19' which form the reflective template pattern 13 are easily removed by wiping with alcohol.

Figure 7:
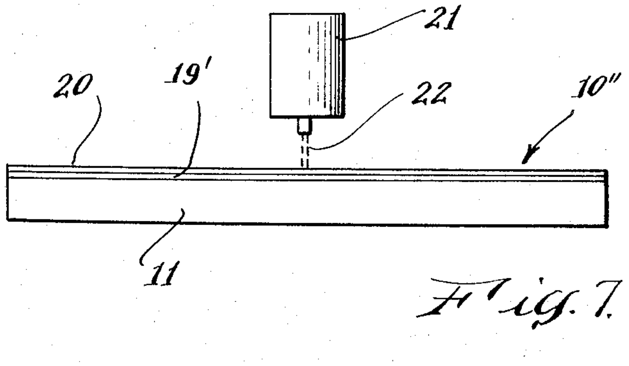
FIGS. 7 and 8 are similar end elevations of the plate of FIG. 6 illustrating the first and second steps for preparing this plate for the production of a relief pattern thereon by applying radiant energy to it.
Figure 8:
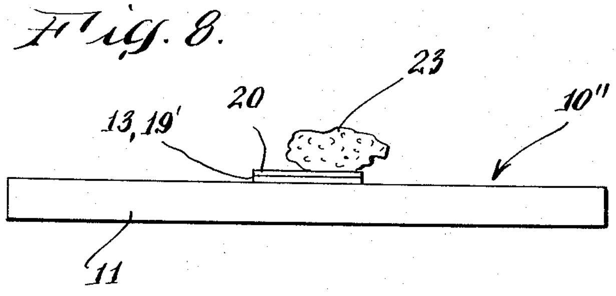

FIGS. 7 and 8 illustrate the manner in which the plate 10'' of this invention, shown in FIG. 6, is adapted to have a relief pattern formed thereon. FIG. 7 illustrates a laser 21 applied for selectively heating portions of the absorbent film 20 for evaporating underlying areas of the reflective film 19' in accordance with the relief pattern desired. The laser 21 may be mounted for its beam 22 to sweep across the surface of the plate 10'' in a scanning pattern and be operated for modulating the beam 22 as the beam 16 sweeps across the plate surface for heating selected portions of the absorbent film 20. As described in the aforementioned copending application for "Printing Plate Production Method and Apparatus", the modulation of the laser beam 22 may be controlled by signals from apparatus which scans a paste-up of the desired format. The radiant energy thus applied to the absorbent film 20 heats selected. portions of it to evaporate and thus remove the immediately adjacent underlying portions of the reflective film 12'. FIG. 8 illustrates a suitable manner of removing the remaining portions of absorbent film 20 from the unvaporized areas of the reflective film 12'', which form the template pattern 13, by wiping it off with a sponge 23 saturated with a suitable solvent such as alcohol.

Thereafter, as previously described with reference to FIG. 3, infrared radiation is applied to the plate and is reflected from the areas which are shielded by the reflective template 13 and is absorbed at the other, unprotected surface, areas of the sheet 11 which are thereby softened and collapse to leave in relief the areas defined by the template 13.

Plate blanks 10 of this invention, illustrated by the plate blanks 10, 10' and 10'', are adapted to be processed as described and provide relief patterns projecting far enough from the collapsed portions, and with sufficiently sharp definition along the edges of the relief, to form a letterpress or letterset printing plates that have printing qualities and durability at least as good as conventional printing plates and that are adapted for use with conventional letterpress or letterset printing apparatus.

What is claimed is:

1. A plate blank adapted to be etched by infrared radiation to provide a selected pattern in relief thereon comprising a sheet of a thermoplastic material that is heat softenable by infrared radiation applied to a surface of the sheet, said sheet having substantially uniformly sized voids substantially uniformly distributed therein, said voids each being from 0.00003 to 0.003 of an inch in diameter and the total of the voids comprising from 15 percent to 70 percent of the volume of the sheet so that said sheet collapses within its own volume by application of an amount of infrared radiation to said surface of the sheet to heat the sheet to its softening temperature, and a film covering at least portions of said surface, said film being a material from the group consisting of aluminum, bismuth, cadmium, gold, silver and zinc that reflects infrared radiation and being adapted for selected areas thereof to be removed from said surface, whereby the areas of said surface from which said film is removed collapse, while the areas covered by said film do not, when a sufficient amount of said radiation is applied to said sheet surface to heat the sheet to its softening temperature.

2. The plate of claim 1 in which said film is a material from the group consisting of aluminum, bismuth, cadmium, silver, gold and zinc.

3. The plate of claim 1 in which said sheet is a material from the group consisting of nylon, polyethylene, polypropylene and urethane.

4. The plate of claim 1 in which said sheet is nylon.

5. The plate of claim 1 in which the voids are each from about 0.0001 to about 0.001 of an inch in diameter.

6. The plate of claim 1 in which substantially none of the voids are larger than about 0.003 of an inch.

7. A plate blank adapted to be etched selectively by infrared radiation to provide a selected pattern in relief thereon comprising, a sheet of thermoplastic material having therein voids of 0.00003 to 0.003 inches in diameter comprising 15 – 70 percent of its volume so that the sheet collapses within its own volume by applying infrared radiation to a surface thereof, a film on the order of one micro inch thick of material from the group consisting of aluminum, bismuth, cadmium, gold, silver and zinc on said surface that reflects infrared radiation and that vaporizes by applying a sufficient amount of heat to it, a thin layer of material from the group consisting of carbon and graphite on the film that is removable therefrom and that absorbs sufficient heat from a laser beam having a wavelength of about one micron applied to it to heat and vaporize the portion of the film underlying the heated portion of the layer, whereby laser beam radiant energy of said wavelength that is normally reflected by the material of the film is adapted for vaporizing, and thus removing, selected areas of the film by being applied to heat a selected area of the absorbent layer of material overlaying the film.

8. The plate of claim 7 in which substantially all the voids are from about 0.0001 to about 0.001 of an inch in diameter.

9. The plate of claim 7 in which substantially none of the voids are larger than about .0003 of an inch in diameter.

* * * * *